United States Patent [19]

Morita

[11] 4,153,400
[45] May 8, 1979

[54] ROTARY PUMPS CIRCULATING PUMPED FLUID TO SEAL

[75] Inventor: Kazuo Morita, Hirakata, Japan

[73] Assignee: Nakamura Kinzoku Kogyosho, Inc., Hirakata, Japan

[21] Appl. No.: 815,719

[22] Filed: Jul. 14, 1977

[30] Foreign Application Priority Data

Jul. 16, 1976 [JP] Japan .................................. 51-95223
Jul. 16, 1976 [JP] Japan .................................. 51-95224

[51] Int. Cl.$^2$ ........................... F04C 1/08; F04C 15/00
[52] U.S. Cl. ..................................... 418/102; 418/104; 418/206
[58] Field of Search ............... 418/102, 104, 180, 205, 418/206, 270

[56] References Cited

U.S. PATENT DOCUMENTS

| | | | |
|---|---|---|---|
| 1,739,139 | 12/1929 | Haight | 418/102 |
| 2,633,807 | 4/1953 | Collura | 418/206 |
| 2,836,125 | 5/1958 | Funk | 418/206 |
| 2,887,058 | 5/1959 | Aspelin et al. | 418/102 |
| 2,998,783 | 9/1961 | Lee | 418/102 |
| 3,191,545 | 6/1965 | Funk | 418/206 |
| 3,272,138 | 9/1966 | Connoy et al. | 418/102 |

*Primary Examiner*—John J. Vrablik

[57] ABSTRACT

Rotary pumps wherein the conveyed fluid, e.g. foodstuffs, entering around the rotor seats, is prevented from staying there statically, by circulating part of the fluid from the high-pressure side of the pump chamber to the low-pressure side through appropriate holes or apertures disposed around the rotor seats, and by making use of the fluid pressure itself. Washing can be carried out around the seats by circulating water that is fed to the pump, instead of the fluid, after the use of the pump has been stopped. The pumps feature a fluid circulating passage between the high-pressure side and a space in a cap portion, for purposes of cleaning that space.

4 Claims, 4 Drawing Figures

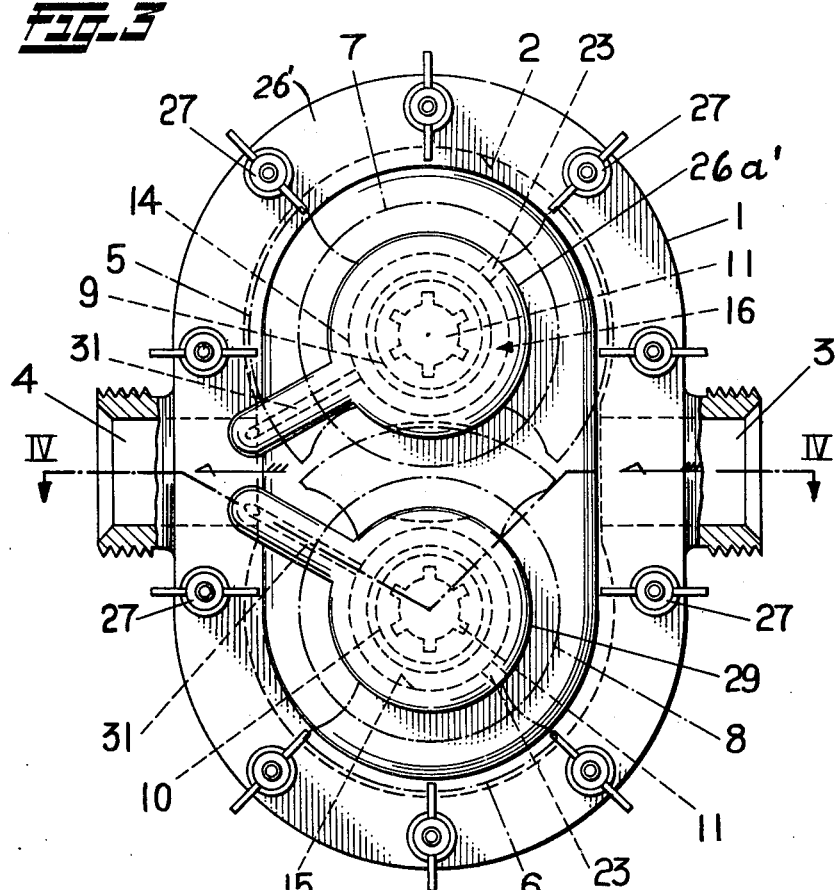
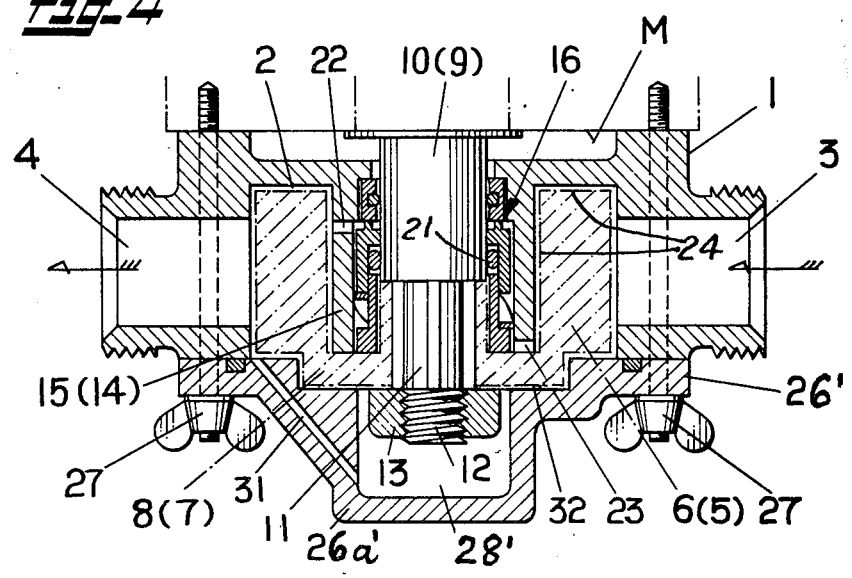

ROTARY PUMPS CIRCULATING PUMPED FLUID TO SEAL

In a rotary pump in which fluid foodstuffs are transported or conveyed by utilizing the generated suction and exhaust pressures, by the movement of a seal line, as a result of the rotation of rotors behind and in front of the seal line, it is necessary to keep the inside of the rotary pump air-tight so that pressures become fully effective. Therefore, particularly at the bosses of the driving shafts of the rotors, where air-tightness is likely to deteriorate, a mechanical seal is usually used between the bosses and the rotors.

However, if a seal is interposed a very small space is allowed between the bosses and the mechanical seal. As a result, when the fluid foodstuffs are transported by the help of the rotary pump, the fluid flows into the space between the bosses and the seal through a very narrow aperture between the rotors and the pump casing, and then part of the fluid stays in that space. Once the fluid foodstuffs enter the space it is impossible to remove them unless the pump is taken apart.

Especially when the fluid that is conveyed is foodstuffs that may change in quality, deteriorate or rot, there is a great problem from the point of view of hygiene. To prevent such consequences, one is forced to take the rotary pump completely apart, to be washed every day after finishing the operation. Such daily disassembly and assembly of the pumps require troublesome manual labor, and at the same time, several working hours are lost, and the efficiency of manufacture decreases.

Accordingly, an object of the present invention is to provide a rotary pump wherein the bosses and the space between the mechanical seal can be washed without taking the pump apart.

The invention provides holes to circulate part of the fluid, at the high-pressure side of the pump chamber, to the low-pressure side, namely by the utilization of the difference between these pressures.

Furthermore a circulating path may be provided that begins at the high-pressure side of the chamber and ends at the low-pressure side, through the space between the bosses and the mechanical seal which latter is formed during the operation of the pump.

As a result of this inventive structure, if clean water is later fed through the pump instead of the fluid foodstuffs, after finishing the transportation of the foodstuffs, the water moves in the circulating path just as well as the fluid foodstuffs, so that the bosses and the space between the seal can be thoroughly washed without taking the pump apart.

The ends of the driving shafts of the rotors are normally placed inside the pump in order to keep the inside air-tight. The rotors are secured to the shafts by making the rotors cover the shafts as well as nut members at the open ends of the shafts. By the way, the rotors must be provided in such a manner that their sides closely contact the pump casing and a cap member of the casing. For this reason, a projecting part is provided generally over the nut of the cap member, and the nuts which project from the rotor sides are placed in spaces within the projecting parts.

However, if the fluid foodstuffs are transported by operating the rotary pump, part of the fluid enters little by little from the very narrow aperture between the rotors and the cap member, to remain in the space of the projecting part, and once the fluid stays there, it is impossible to remove it unless the pump is taken to pieces.

Another object of the invention is to provide a pump wherein the space in the projecting part can be washed without taking the pump apart.

To this end, holes are provided which connect the high-pressure side of the pump chamber with the space in the projecting part. During the operation of the pump, the fluid moves from the high-pressure side along the following circulating path: the circulating holes or passages—the space in the projecting part—the narrow aperture between the rotors and the cap member—the low-pressure side (outlet) of the pump chamber.

In such a structure, if clean water is fed into the pump instead of fluid foodstuffs, after finishing the conveyance of the foodstuffs, the water flows in the circulating path as do the fluid foodstuffs, so that the space in the projecting part is being washed without disassembling the pump.

In a rotary pump of the conventional type, wherein the fluid stays statically in the space between the bosses and the mechanical seal, the trapped fluid soon changes in quality by the effect of the frictional heat generated in the mechanical seal. Moreover, when a cohesive fluid as chocolate or the like is transported, it becomes stiff or at least tacky, because of the heat, often to a degree that it adheres firmly to the seal surface, which causes problems, in damaging the sealing effect.

Yet another object of the invention is to provide a rotary pump wherein the influence of the heat upon the conveyed fluid is eliminated.

According to the invention, holes are provided in the bosses as mentioned before, constituting a circulating path or passage, wherein part of the fluid at the high-pressure side of the chamber moves from the space between the bosses and the mechanical seal to the low-pressure side. According to the novel structure, the frictional heat is conveyed in succession by the fluid moving in the space between the bosses and the mechanical seal, and the fluid itself functions as a lubricant. Moreover, the change in quality of the fluid remaining at that point, or the damage of the seal, may be avoided since new fluid continually enters the space and then leaves it again.

It will be understood by those skilled in the art that rotary pumps are being mentioned and described herein only as a matter of example, preferably of the external-gear type, while the present invention is applicable in all of its aspects to other pumps, such as internal-gear and vane-type pumps as well.

Further objects, important inventive features, as well as advantages of this invention will become better understood when reading the following detailed description in conjunction with the accompanying drawings, wherein FIG. 1 is an elevational view, partly in section, of a rotary pump in a first exemplary embodiment of the present invention;

FIG. 3 is a view similar to that of FIG. 1, showing a modified embodiment; and

FIG. 4 is a section similar to that of FIG. 3, taken along the line IV—IV of FIG. 3.

Figure 1:
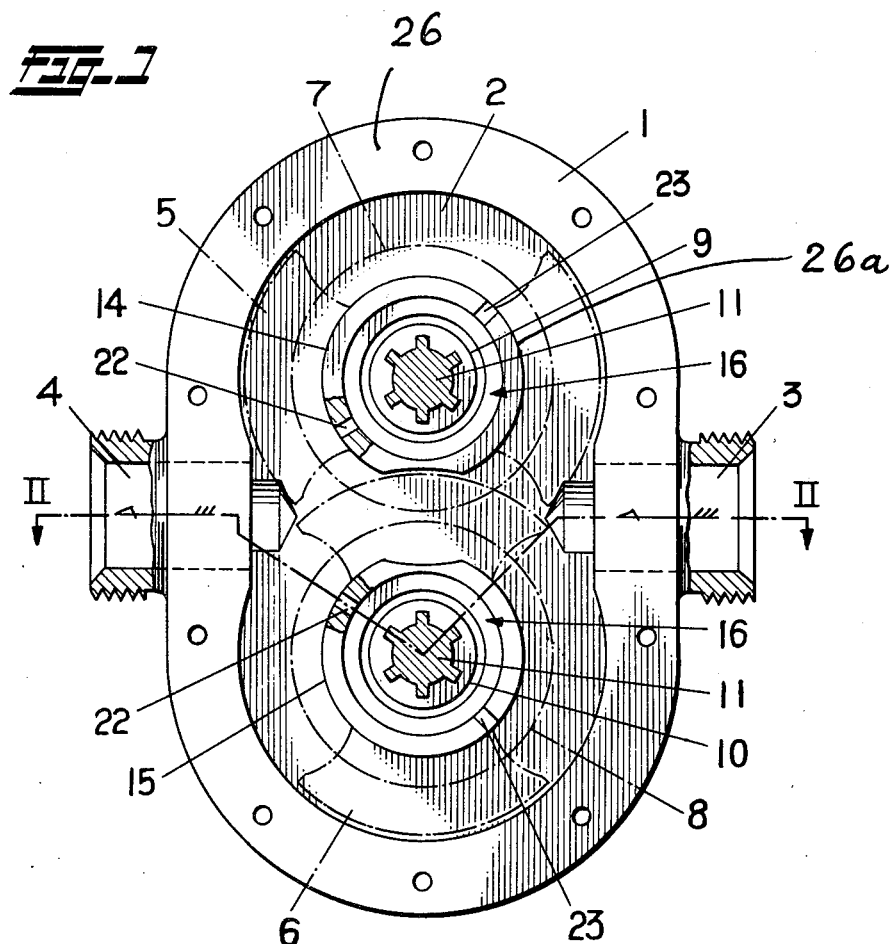
Figure 2:
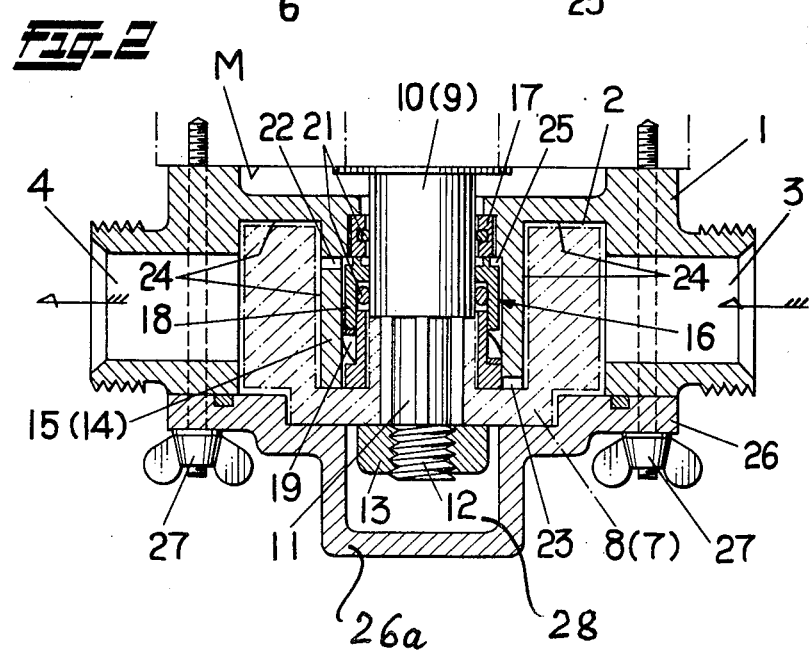
FIG. 2 is a longitudinal section, taken along the line II—II of FIG. 1.

In FIGS. 1 and 2, showing a first exemplary embodiment, numeral 1 denotes a pump casing wherein a number eight-shaped pump chamber 2 is provided. An inlet 3 leading to the chamber is at one side of the casing 1, and an outlet 4 leading from the same chamber at the other side. Upper and lower rotors 7, 8 having respective teeth 5, 6 are mounted at upper and lower parts within the chamber 2. Rotor 7 is driven by a shaft 9 associated with a motor M, and rotor 8 by a shaft 10 in meshing engagement with the shaft 9 and rotating in cooperation therewith. As a result, the fluid is sucked from the inlet 3 and discharged through the outlet 4.

Each rotor 7, 8 covers a portion 11 of smaller diameter at the end of the respective shaft 9, 10 as shown in FIGS. 2, 4 (except where indicated, the structure of the modified embodiment of FIGS. 3, 4 is similar to that illustrated in FIGS. 1, 2 and being first described), and is fixed by clamping a securing nut 13 with a male screw 12 provided at the end of the portion 11. Each shaft 9, 10 is inserted in an overhung position in a respective boss 14, 15 provided projectingly within the pump chamber 2.

A mechanical seal 16 is provided between the bosses 14, 15 and the rotors 7, 8. The seal 16 may include a carbide seal material 17 such as ceramics, mounted in a fixed position on the side of the bosses 14, 15, and/or a carbon seal material 18 which is usually pressed closely to the surface of the material 17 by a plate spring 19. There are also a seat 20 for the spring and O-rings 21. The material 18, the spring 19 and the seat 20 rotate in the pump body.

A circulating hole 22 which passes through the bosses 14, 15 is provided on a part of the peripheral surface of the high-pressure outlet side. Moreover, another circulating hole 23 which also traverses the bosses 14, 15 is provided at the low-pressure inlet side, at a position which has an angle phase relationship of 180° to the hole 22.

A description is now given wherein a fluid is conveyed by the rotation of the rotors 7, 8. By the operation of the pump, part of the fluid enters a space 25 between the bosses 14, 15 and the seal 16 through a very narrow aperture 24 made between the rotors 7, 8 and the pump casing 1, and remains in the space 25.

If there were no provision of the inventive holes 22, 23 described earlier, the seal 16 would generate substantial frictional heat by contact of the materials 17 and 18 as a result of the rotation of the shafts 9, 10, the heat being necessarily absorbed by the fluid while it is in the space 25. Accordingly, the fluid also acts as a lubricant.

However, if the fluid happens to be a cohesive material such as chocolate, it may undergo a change in quality due to the rise of its temperature. At the same time, the changed fluid may stick to the seal surface between the materials 17, 18, possibly to the extent of solidifying, and then the seal may be damaged by the sticking substance. Under these circumstances it would become impossible for the materials 17 and 18 to contact each other properly. Moreover, it would become impossible to remove the fluid from the space 25 unless the rotary pump is taken apart after its use, which is time consuming and unnecessary.

As a result of the provision of the holes 22, 23 according to the invention, the fluid enters in succession the space 25 between the bosses 14, 15, and the seal 16 during operation of the rotary pump. Part of the fluid which is imparted a high pressure, moving from the inlet 3 to the outlet 4 by the function of the rotors 7, 8, enters the bosses 14, 15 from the narrow aperture 24 due to the pressure. The fluid, once entering the space 25, thus has a high pressure and is pushed by the following fluid amounts that enter in succession, so that it is discharged from the hole 23 at the inlet 3 to the outlet 4.

In accordance with the movement of the rotors 7, 8, part of the fluid that moves from the inlet 3 to the outlet 4 carries out a circulating movement along the following path: hole 22 - space 25 between the bosses 14, 15 and the mechanical seal 16 - hole 23 - narrow aperture 24 - inlet 3, and vice versa, to outlet 4.

When a flow of the fluid as described above is generated between the bosses 14, 15 and the seal 16, the pressure inside the space 25 is kept high owing to the dynamic pressure caused by the fluid flow. Accordingly the sealing ability of the mechanical seal 16, namely the air-tightness of the pump casing 1, is substantially increased. The frictional heat generated between the materials 17 and 18 is conveyed in succession by the fluid flow so that the latter functions as a lubricant for the seal 16.

Even if the fluid were cohesive as mentioned before, it will not stick as a tacky or solid substance to the surface between the materials 17, 18 because of the fluid flow and the complete absorption of the frictional heat.

When the fluid transported by the rotary pump is foodstuffs, clean water can be fed after the day's work to the inlet 3 instead of the foodstuffs. The rotors 7, 8 are kept rotating as before. Part of the water which now flows from the inlet 3 to the outlet 4, also following the described course: parts 22 - 25 - 23 - 24 - to 3, and vice versa, depending on the rotation of the rotors 7, 8.

This can be repeated as far the high-pressure of the outlet side is utilized. Accordingly, any fluid foodstuffs trapped in the space 25 and the narrow aperture 24 are washed away completely by the circulation of the water and are discharged through the outlet 4 so that the inside of the rotary pump is thoroughly cleaned without taking the pump apart. There is no inconvenience or disturbance when using the pump the following day.

When the fluid foodstuffs are condensed juice and the like, the juice is usually heated to about 100° C. in a pressure-proof container in order to increase its condensation immediately before the juice is fed into the rotary pump. At the same time the air within the container is kept at a negative pressure of about 700 mm Hg which is nearly a vacuum, e.g. by a vacuum pump having great suction lift, in order to promote the evaporation of water.

If such a condensed juice is discharged from the pressure-proof container by the rotary pump, the inlet 3 of the latter displays a negative pressure almost equal to that in the container. Then, the pressure in the space 25 also turns to be a negative pressure, particularly at the inlet side, and a considerable difference is generated from atmospheric pressure. Therefore, the contact pressure between the materials 17, 18 would cease on effect of the atmospheric pressure which destroys the seal.

However, according to the invention, the outside (atmospheric) pressure and the inside pressure of the mechanical seal 16 nearly keep balance, due to the high dynamic pressure, as the condensed juice at the high-pressure outlet 4 flows from the hole 22 to the space 25 so that satisfactory contact pressure by the spring 19 is ensured between the materials 17 and 18, and the seal is not impaired or destroyed at all.

So far, it should be noted, all described parts numbered 1 through 25, namely those of the described embodiment of FIGS. 1, 2, are identical for the modified embodiment shown in FIGS. 3, 4; differences and modified details will be described separately for the latter.

In FIG. 2, numeral 26 denotes a cap member for the pump casing 1, which is preferably mounted to the casing by clamp members 27 (omitted from FIG. 1) in such a manner that the cap member 26 can be easily mounted and dismounted.

In FIGS. 3 and 4, a somewhat different cap member 26' is shown, to be described later in more detail, similar clamp members 27 being applicable as before.

The securing nut 13 and the male screw 12, in order to fix the rotors 7, 8 to each of the shafts 9, 10, are accommodated in a projecting part 26a (FIGS. 1, 2) and 26a' (FIGS. 3, 4) of the respective cap members 26, 26'.

In the modified embodiment of FIGS. 3 and 4, the pump casing 1, as well as the parts 2 through 25 are as described for the first embodiment, including the holes 22, 23 and the clamp members 27. The seal materials 17, 18 with the associated elements 19, 20, 21 are optional for both embodiments (although identified by numerals only in FIG. 2). Finally, the aperture 24 and the space 25 are also optional for the modified embodiment (not shown therein).

In FIG. 2, the projecting part 26a has therein a space 28 which takes up the earlier-described elements 12, 13; in FIG. 4 the projecting part 26a' defines a similar but somewhat larger space 28'.

The modified embodiment shows in both figures a fluid circulating passage 31 that passes from the high-pressure side of the chamber 2 to the low-pressure side.

In this modified construction, when the fluid is transported by rotating the rotors 7, 8 the fluid is moved from the inlet 3 to the outlet 4, and as the outlet side has a high pressure, the high-pressure fluid flows in the space 28' of the projecting part 26a' through the passage 31 to increase the pressure of that space 28'.

The high-pressure fluid tends to move to the inlet side which has a lower pressure, and the fluid arrives at the inlet 3 through a narrow aperture 32 (part of the modified embodiment, together with the passage 31, see FIG. 4) made at a frictional surface between the cap member 26' and the rotors 7, 8.

In a rotary pump of the conventional type, the fluid which passes through the aperture 32 due to capillarity, etc. flows into the projecting part 26a' and stays there. To the contrary, in the inventive, modified embodiment, the high-pressure fluid at the outlet side is made to flow positively into the part 26a' by providing the passage 31, and the fluid is made to flow to the inlet 3, reversely, through the narrow aperture 32 by dynamic pressure.

Part of the fluid which has flown from the inlet 3 and arrived at the outlet 4 when operating the rotary pump moves along the following path: passage 31 - space 28' in the projecting part 26a' - narrow aperture 32 - inlet 3, and vice versa, depending on the rotation of the rotors 7, 8.

Accordingly, after the processing (pumping) of the fluid foodstuffs is finished, for example, at the end of the daily work, if clean water is then fed to the inlet 3 instead of the foodstuffs, and the rotors 7, 8 are again rotated, part of the water which enters from the inlet 3 and arrives at the outlet 4 also moves along the described path: parts 31 - 28' - 32 - to 3, and vice versa.

This phenomenon is accomplished when the high pressure at the outlet side is utilized. Accordingly, any fluid foodstuffs which might stay in the space 28' and the narrow aperture 32 can be washed away with the circulation of water and discharged from the outlet 4, so that the rotary pump is cleaned completely without taking the same to pieces, and there is no inconvenience in re-use on the following day.

In the present invention, rotary pumps of the external-gear type are taken as examples; however, the invention is also applicable to internal-gear pump types and to vane pump types as well.

Those skilled in the art will appreciate that, in the usual manner, modifications, departures, additions and substitutions can be made in the described first and in the modified second exemplary embodiments, without departing from the spirit and scope of the invention as set out herein.

What I claim is:

1. A rotary pump for fluids, part of which can be circulated to a seal for cleaning purposes, comprising a pump casing (1) wherein an inlet (3) constituting the low-pressure side of a pump chamber (2) for a fluid passing through the pump, and an outlet (4) are provided which latter constitutes the high-pressure side; bosses (14, 15) in said chamber, projecting from said casing; driving shafts (9, 10) inserted in said bosses and having free ends (12); rotors (7, 8) about said shafts in said chamber; securing means (13) engaging said free ends to fix said rotors to said shafts; a seal member (16) between said bosses and said rotors; and a cap member (26/26') fixed to said casing to seal said chamber; there being holes (22, 23) passing through said bosses to circulate part of the fluid from said high-pressure side to said low-pressure side of the chamber; wherein said cap member has a projecting part (26a/26a') with a space (28/28') therein, for cleaning by the fluid, in which space said securing means is disposed; further comprising a circulating passage (31) interconnecting said high-pressure side of the chamber with said space, also for cleaning by the fluid; and a narrow aperture (32) at a contact surface between said cap member and said rotors on the low-pressure side; and there being a space (25) between said bosses and said seal member; and a narrow aperture (24) between said casing and said rotors, said last-named space being also cleaned by the fluid.

2. The rotary pump as defined in claim 1, wherein said holes (22, 23) are provided at positions which have an angle phase relationship of 180° with respect to each other in respective peripheral surfaces of said chamber (2) on the high-pressure and low-pressure sides of the chamber.

3. The rotary pump as defined in claim 1, wherein said seal member (16) is a multi-part mechanical seal (17 ... 21).

4. The rotary pump as defined in claim 1, wherein the pump is of the external-gear type.

* * * * *